UNITED STATES PATENT OFFICE.

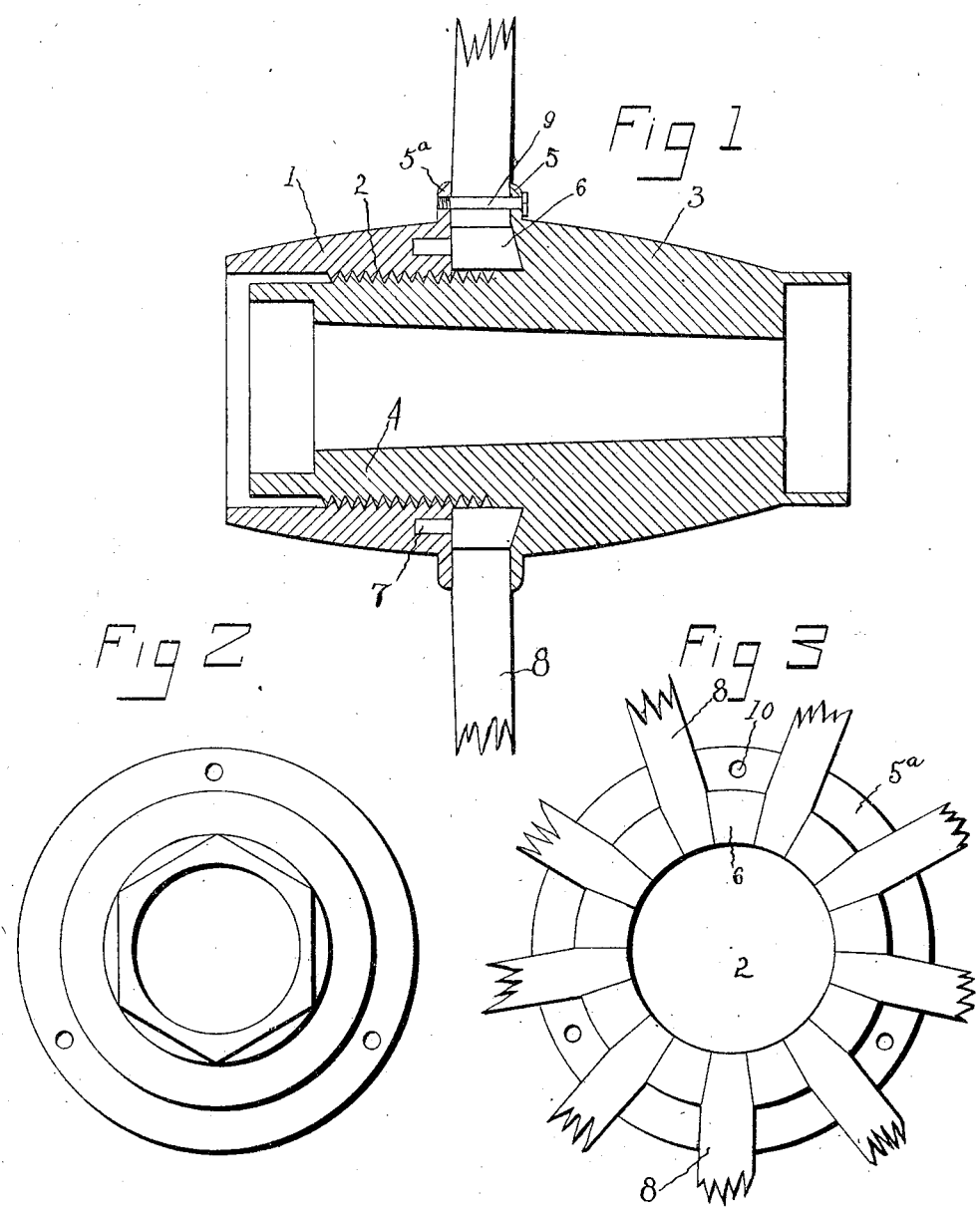

JOHN C. HAWKINS, OF LOUDONVILLE, OHIO.

HUB.

No. 810,754.　　　Specification of Letters Patent.　　　Patented Jan. 23, 1906.

Application filed May 19, 1905. Serial No. 261,233.

*To all whom it may concern:*

Be it known that I, JOHN C. HAWKINS, a citizen of the United States, residing at Loudonville, in the county of Ashland and State of Ohio, have invented certain new and useful Improvements in Hubs, of which the following is a specification.

My invention relates to hubs for wheels, and has for its object to provide a hub adapted to permit the insertion of a new spoke without disturbing the tire or felly of the wheel.

A further object of my invention is to provide a hub of the character described which will hold the spokes firmly and securely against movement in any direction.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a sectional view of my improved hub. Fig. 2 is an end view of the outer member of the hub; and Fig. 3 is a view of the internally-threaded member, showing the spacers and spoke ends in position.

Referring to the drawings, in which like numerals indicate corresponding parts throughout the several views, 1 is that member of the hub nearest the wagon when the wheel is on the axle. This member 1 has an enlarged threaded opening 2 running longitudinally therethrough. The outer member 3 of the hub, which is of substantially the same diameter as member 1, has an externally-threaded cylindrical portion 4 adapted to enter and engage the internally-threaded member 1. Upon the peripheries of members 1 and 3 are located flanges 5 and 5ª, which form a continuation of the adjacent vertical faces of said members. Tapering spacers 6, provided with projecting pins 7 on one end, are disposed between said adjacent faces, said spacers being held in place by pins 7 entering holes provided in member 1. The spaces between the spacers 6, together with the adjacent vertical faces of members 1 and 3, form sockets for the ends of spokes 8. Bolts 9 pass through holes in flange 5 and are screwed into threaded openings 10 in flange 5ª.

The operation of my device is as follows: Member 1 being placed in the center of the felly after the tire is placed thereon, the spokes are inserted in the felly and then forced between the proper spacers 6, which are in position on member 1. When all the spokes are in place, projection 4 is screwed into member 1, the outer end of member 3 having angular faces to receive a wrench. The two members, securely holding the spokes, are prevented from coming loose by bolts 9. It will be observed that a new spoke can be inserted in the wheel by removing bolts 9, unscrewing member 3, and replacing the old spoke with a new one, after which the parts are returned to their former position in the manner above described.

Having thus described my invention, what I claim, and desire to secure by Letters Patent, is—

1. A hub comprising an internally-threaded member, a second member of substantially the same diameter provided with an externally-threaded cylindrical portion adapted to enter and engage said internally-threaded member, tapering spacers, dowel-pins carried by said spacers, said pins entering recesses formed in the internally-threaded member, said spacers being adapted to form sockets for the spokes and means for securing said members into an engaging position.

2. A hub comprising an internally-threaded member having an annular flange, an externally-threaded member also provided with an annular flange, tapering spacers having dowel-pins projecting therefrom, said pins entering recesses formed in the internally-threaded member, said spacers forming sockets for the spokes and bolts which pass through the annular flanges of both the externally-threaded and the internally-threaded members to bind said members into position.

In testimony whereof I affix my signature in presence of two witnesses.

JOHN C. HAWKINS.

Witnesses:
　E. L. SMITH,
　J. R. HISSEM.